United States Patent
Schepperle (10) Patent No.: US 10,119,595 B2
(45) Date of Patent: Nov. 6, 2018

(54) DUAL CLUTCH TRANSMISSION FOR A MOTOR VEHICLE

(71) Applicant: ZF Friedrichshafen AG, Friedrichshafen (DE)

(72) Inventor: Bernd Schepperle, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 549 days.

(21) Appl. No.: 14/934,290

(22) Filed: Nov. 6, 2015

(65) Prior Publication Data

US 2016/0131225 A1 May 12, 2016

(30) Foreign Application Priority Data

Nov. 7, 2014 (DE) .......................... 10 2014 222 821

(51) Int. Cl.
| | |
|---|---|
| *F16H 3/097* | (2006.01) |
| *F16H 3/00* | (2006.01) |
| *F16H 3/093* | (2006.01) |

(52) U.S. Cl.
CPC .............. *F16H 3/097* (2013.01); *F16H 3/006* (2013.01); *F16H 3/093* (2013.01);
(Continued)

(58) Field of Classification Search
CPC .......... F16H 3/006; F16H 3/093; F16H 3/097; F16H 2003/0933; F16H 2200/0069; F16H 2200/0086
(Continued)

(56) References Cited

U.S. PATENT DOCUMENTS

| 4,463,621 A | 8/1984 | Fisher |
|---|---|---|
| 5,125,282 A | 6/1992 | Bender et al. |

(Continued)

FOREIGN PATENT DOCUMENTS

| DE | 39 26 570 A1 | 2/1991 |
|---|---|---|
| DE | 199 39 819 C1 | 11/2000 |

(Continued)

OTHER PUBLICATIONS

German Search Report Corresponding to 10 2014 222 820.4 dated Nov. 17, 2015.

(Continued)

*Primary Examiner* — William C Joyce
(74) *Attorney, Agent, or Firm* — Davis & Bujold PLLC; Michael J. Bujold (57) ABSTRACT

A dual-clutch transmission has first and second coaxial input shafts, the second shaft extending through the first shaft. The input shafts couple respective countershafts via input constants which have drive input and output wheels. The countershafts are selectively connectable, via spur gear stages that can be engaged by gearshift elements, to an output shaft. Four gear stages engage forward gears and one reverse gear stage engages reverse gears. The second and fourth gear stages are arranged between the first countershaft and the output shaft, and the other gear stages are arranged between the second countershaft and the output shaft. The first input constant has a higher gear ratio than the second input constant. The output of the first input constant is a loose wheel supported on the second countershaft and can couple the first countershaft by a first coupling element. A second coupling element couples the first and second countershafts.

11 Claims, 3 Drawing Sheets

(52) U.S. Cl.
CPC ............ *F16H 2003/0933* (2013.01); *F16H 2200/0069* (2013.01); *F16H 2200/0086* (2013.01)

(58) Field of Classification Search
USPC .......................................... 74/330
See application file for complete search history.

(56) References Cited

U.S. PATENT DOCUMENTS

| | | | |
|---|---|---|---|
| 5,603,242 A * | 2/1997 | Krieger | F16H 3/006 74/335 |
| 7,409,886 B2 | 8/2008 | Gitt | |
| 7,437,964 B2 | 10/2008 | Gitt | |
| 9,068,627 B2 * | 6/2015 | Wechs | F16H 3/006 |
| 2006/0123939 A1* | 6/2006 | Akutagawa | F16H 3/006 74/329 |
| 2010/0192717 A1* | 8/2010 | Gitt | F16H 3/006 74/330 |

FOREIGN PATENT DOCUMENTS

| | | |
|---|---|---|
| DE | 103 32 210 A1 | 2/2005 |
| DE | 103 35 262 A1 | 3/2005 |
| DE | 10 2013 213 157 A1 | 1/2015 |

OTHER PUBLICATIONS

German Search Report Corresponding to 10 2014 222 821.2 dated Nov. 17, 2015.

* cited by examiner

| GEAR | K1 | K2 | A | B | C | D | E | L | M | N | O | i | φ |
|---|---|---|---|---|---|---|---|---|---|---|---|---|---|
| G1 | X | — | X | — | — | — | — | — | — | — | X | 8.43 | 1.31 |
| G2 | — | X | X | — | — | — | — | — | — | — | — | 6.45 | 1.30 |
| G3 | X | — | — | X | — | — | — | X | — | — | — | 4.95 | 1.31 |
| G4 | — | X | — | X | — | — | — | — | X | — | — | 3.79 | 1.31 |
| G5 | X | — | — | X | — | — | — | — | — | X | — | 2.89 | 1.30 |
| G6 | — | X | — | — | X | — | — | — | — | — | — | 2.23 | 1.30 |
| G7 | X | — | — | — | — | X | — | X | — | — | — | 1.71 | 1.31 |
| G8 | — | X | — | — | — | X | — | — | X | — | — | 1.31 | 1.31 |
| G9 | X | — | — | — | — | X | — | — | — | X | — | 1.00 | 1.31 |
| G10 | — | X | — | — | — | X | — | — | — | X | X | 0.76 | |
| R1 | X | — | — | — | — | — | X | — | — | — | X | -8.16 | 1.31 |
| R2 | — | X | — | — | — | — | X | — | — | — | — | -6.24 | |

DUAL CLUTCH TRANSMISSION FOR A MOTOR VEHICLE

This application claims priority from German patent application serial no. 10 2014 222 821.2 filed Nov. 7, 2014.

FIELD OF THE INVENTION

The invention concerns a dual-clutch transmission for a motor vehicle, having a centrally arranged first input shaft and a second input shaft in the form of a hollow shaft arranged coaxially over the first input shaft, in which on their drive input side the two input shafts can be connected each by way of a respective friction clutch to the driveshaft of a drive engine, in which on their transmission side the two input shafts are or can be brought into driving connection with a respective countershaft by way of input constants in each case comprising a drive input wheel and a drive output wheel, in which the countershafts can each be brought into driving connection, selectively by way of a number of spur gear stages that can in each case be shifted by means of a respective gearshifting element, with an output shaft arranged coaxially with and axially adjacent to the first input shaft, and in which the first countershaft is in the form of a hollow shaft and is positioned coaxially over the second countershaft.

BACKGROUND OF THE INVENTION

In a front longitudinal configuration of a drive unit consisting of a drive engine and a transmission in a motor vehicle, the output shaft of the transmission is preferably arranged in a common geometrical axis with the input shaft or input shafts of the transmission. In the case of a dual-clutch transmission with a centrally arranged first input shaft and a second input shaft in the form of a hollow shaft fitted coaxially over the first input shaft, the coaxial arrangement of the output shaft required for this can be achieved if, by way of a respective input constant in each case, the input shafts are or can be brought into driving connection with an associated countershaft. To engage the gears, the countershafts can each be brought into driving connection with the output shaft by means of a number of spur gear stages, each of which can respectively be engaged by means of a gearshifting element. Furthermore, with this arrangement a direct gear can usually be engaged by connecting the first input shaft to the output shaft in a rotationally fixed manner.

In a generally known first basic design of a dual-clutch transmission of this type, the countershafts are arranged axis-parallel with and a distance away from one another and from the output shaft. In an embodiment of a dual-clutch transmission known from U.S. Pat. No. 4,463,621 B1, the shiftable spur gear stages are arranged in various gearwheel planes. The loose wheels of the spur gear stages are in each case mounted to rotate on the output shaft and can be connected in a rotationally fixed manner to the output shaft by means of the associated gearshifting elements. By virtue of a coupling shifting element arranged between the central, first input shaft and the output shaft, a direct gear can be engaged. For four forward gears and one reverse gear, this known dual-clutch transmission requires a total of six gearwheel planes.

In contrast to this, in a dual-clutch transmission known from DE 103 35 262 A1 there are five spur gear stages and one reversing spur gear stage, each using a common fixed wheel or loose wheel arranged on the output shaft in pairs in common gearwheel planes. The two outer gearwheels of the reversing spur gear stage are loose wheels, whereby two out of three possible reverse gears can be engaged as winding gears. For seven forward gears and three reversing gears this known dual-clutch transmission has a total of seven gearwheel planes.

In a generally known second basic embodiment of such a dual-clutch transmission the second countershaft associated with the second input shaft is arranged axis-parallel with and a distance away from the output shaft, and the first countershaft associated with the first input shaft is in the form of a hollow shaft arranged coaxially over the second countershaft.

In the dual-clutch transmission of this type known from DE 199 39 819 C1 the shiftable spur gear stages are arranged in different gearwheel planes. The loose wheels of the spur gear stages are in each case mounted to rotate on the output shaft and can be connected rotationally fixed thereto by the associated gearshift elements. By means of a coupling shifting element arranged between the centrally positioned first input shaft and the output shaft, a direct gear can be engaged. For six forward gears and one reverse gear this known dual-clutch transmission needs a total of eight gearwheel planes.

In contrast, in a further embodiment of a dual-clutch transmission of this type known from DE 103 32 210 A1 the drive output wheel of the first input constant associated with the first input shaft is in the form of a loose wheel, which is mounted to rotate on the first countershaft and can be connected rotationally fixed thereto by means of a first coupling shifting element. In addition the first countershaft can be connected rotationally fixed to the second countershaft by means of a second coupling shifting element. By means of the two coupling shifting elements, the spur gear stages arranged between the first countershaft and the output shaft can be alternately brought into driving connection with the first or second input constant and thus used, in each case, for the engagement of two gears. For six forward gears and one reverse gear, this known dual-clutch transmission has a total of six gearwheel planes.

SUMMARY OF THE INVENTION

The purpose of the present invention is to propose a dual-clutch transmission of the type mentioned to begin with, which corresponds to the second basic embodiment, which has compact dimensions and which provides at least eight forward gears and at least one reverse gear. If possible all the forward gears should be powershiftable in sequential gearshifts and should have a geometric gear gradation.

This objective is achieved by a dual-clutch transmission having the characteristics and advantageous developments as described below.

Accordingly, the invention concerns a dual-clutch transmission for a motor vehicle, having a centrally arranged first input shaft and a second input shaft in the form of a hollow shaft arranged coaxially over the first input shaft, in which on their drive input side the two input shafts can be connected each by way of a respective friction clutch to the driveshaft of a drive engine, in which on their transmission side the two input shafts are or can be brought into driving connection with a respective countershaft by way of input constants in each case comprising a drive input wheel and a drive output wheel, in which the countershafts can each be brought into driving connection, selectively by way of a number of spur gear stages that can in each case be shifted by means of a respective gearshifting element, with an output shaft arranged coaxially with and axially adjacent to the first input shaft, and in which the first countershaft is in the form of a hollow shaft and is positioned coaxially over the second countershaft.

In this dual-clutch transmission, according to the invention it is additionally provided that there are four spur gear stages for engaging forward gears, whose gear ratios ($i_{Z1}$, $i_{Z2}$, $i_{Z3}$, $i_{Z4}$) decrease with increasing order number ($i_{Z1} > i_{Z2} > i_{Z3} > i_{Z4}$), and a reversing spur gear stage for engaging reverse gears, with the second spur gear stage and the fourth spur gear stage arranged between the first countershaft and the output shaft, with the first, third and reversing spur gear stages arranged between the second countershaft and the output shaft, with the first input constant having a higher gear ratio than the second input constant, the drive output wheel of the first input constant being in the form of a loose wheel mounted to rotate on the second countershaft and being able to be connected in a rotationally fixed manner to the first countershaft by means of a first coupling shifting element, and a second coupling shifting element being provided, by means of which the first countershaft can be connected rotationally fixed to the second countershaft.

By virtue of this configuration of the dual-clutch transmission, the existing four spur gear stages and the one reversing spur gear stage can be brought selectively into driving connection with the two input constants, and thus engaged both by way of the first friction clutch and the first input shaft and by way of the second friction clutch and the second input shaft. For this, the drive output wheel of the first input constant in the form of a loose wheel can be connected in a rotationally fixed manner to the first countershaft by means of the first coupling shifting element and in addition, by virtue of the second coupling shifting element, it can also be connected rotationally fixed to the second countershaft. On the other hand the drive output wheel of the second input constant, which is attached rotationally fixed on the second countershaft, can also be connected to the first countershaft in a rotationally fixed manner by means of the second coupling shifting element. Thus, with the four spur gear stages eight forward gears and with the reversing spur gear stage two reverse gears can be engaged. Except for the fourth gear that can be engaged by way of the second input constant and the second spur gear stage, and also the fifth gear that can be engaged by way of the first input constant and the third spur gear stage, all the forward gears can be powershifted. So too can the two reverse gears.

To produce the desired geometric gear gradation, it is provided that the spur gear stages for the forward gears have a substantially geometric gear ratio gradation ($i_{Zn}/i_{Zn+1}$ constant), and that the gear ratio gradation ($i_{E1}/i_{E2}$) of the input constants corresponds substantially to the square-root of the gear ratio gradation ($i_{Zn}/i_{Zn+1}$) of the spur gear stages for the forward gears ($i_{E1}/i_{E2} = (i_{Zn}/i_{Zn+1})^{1/2}$).

To make the gearshifts between the fourth gear and the fifth gear also powershiftable and in addition to enable the engagement of a direct gear, according to another further development of the invention it is provided that the fourth spur gear stage is arranged axially adjacent to the first input constant, and the loose wheel of the fourth spur gear stage is mounted to rotate on the output shaft and can be connected rotationally fixed to the first input shaft by means of a third coupling shifting element.

By engaging the third coupling shifting element and the gearshift element of the second spur gear stage, a gear associated with the first friction clutch can now be engaged, in which gear, when the first friction clutch is closed, the force flow passes from the driveshaft of the drive engine, via the first input shaft, the fourth spur gear stage, the first countershaft and the second spur gear stage, to the output shaft.

Likewise, by engaging the third coupling shifting element and the gearshift element of the fourth spur gear stage, a direct gear can be engaged as a ninth gear, in which when the first friction clutch is closed, the force flow passes from the driveshaft of the drive engine, via the first input shaft and the loose wheel of the fourth spur gear stage, to the output shaft.

So that the gear which can be engaged by means of the third coupling shifting element and the gearshift element of the second spur gear stage is sequenced with a substantially identical gear gradation as the fifth gear between the other forward gears, the gear ratios ($i_{E1}$, $i_{E2}$, $i_{Z1}$, $i_{Z2}$, $i_{Z3}$, $i_{Z4}$) of the input constants and the spur gear stages are chosen such that the gear which can be engaged by means of the third coupling shifting element and the gearshift element of the second spur gear stage has a lower gear ratio than the fourth gear that can be engaged by means of the second coupling shifting element and the gearshift element of the second spur gear stage, but a higher gear ratio than the sixth gear, which can be engaged by means of the gearshift element of the third spur gear stage ($i_{G4} > i_{G5} > i_{G6}$), and the gear intervals between the fifth gear and the gears directly adjacent to it correspond substantially to the gear gradation of the other forward gears ($i_{G4}/i_{G5} = i_{G5}/i_{G6} = i_{Gn}/i_{Gn+1}$).

So that the direct gear which can be engaged by means of the third coupling shifting element and the gearshift element of the fourth spur gear stage supplements the other forward gear as a ninth gear with a substantially identical gear gradation, the gear ratios ($i_{E1}$, $i_{E2}$, $i_{Z1}$-$i_{Z4}$) of the input constants and the spur gear stages are chosen such that the direct gear (the ninth gear) that can be engaged by means of the third coupling shifting element and the gearshift element of the fourth spur gear stage has a lower gear ratio than the eighth gear which can be engaged by means of the second coupling shifting element and the gearshift element of the fourth spur gear stage ($i_{G8} > i_{G9}$), and the gear interval between the direct gear (the ninth gear) and the adjacent eighth gear corresponds substantially to the gear gradation of the other forward gears ($i_{G8}/i_{G9} = i_{Gn}/i_{Gn+1}$).

To engage a further, tenth gear designed as an overdrive gear, it is preferably provided that the loose wheel of the first input constant can be connected rotationally fixed to the second countershaft by means of a fourth coupling shifting element. In this tenth gear associated with the second friction clutch, when the second friction clutch is closed and the third and fourth coupling shifting elements and the gearshift element of the fourth spur gear stage are engaged, the force flow passes from the driveshaft of the drive engine, via the second input shaft, the second input constant, the first input constant and the loose wheel of the fourth spur gear stage, to the output shaft.

So that the gear which can be engaged by means of the third and fourth coupling shifting elements and the gearshift element of the fourth spur gear stage supplements the other forward gears as a tenth gear with substantially identical gear gradation, the gear ratios ($i_{E1}$, $i_{E2}$, $i_{Z1}$-$i_{Z4}$) of the input constants and the spur gear stages are chosen such that said tenth gear, which can be engaged by means of the third and fourth coupling shifting elements and the gearshift element of the fourth spur gear stage, has a lower gear ratio than the direct gear (the ninth gear) ($i_{G9} > i_{G10}$) and the gear interval between the tenth gear and the adjacent direct gear (the ninth gear) corresponds substantially to the gear gradation of the other forward gears ($i_{G9}/i_{G10} = i_{Gn}/i_{Gn+1}$).

If, besides the loose wheel of the fourth spur gear stage, the loose wheel of the second spur gear stage as well is mounted to rotate on the output shaft, then the gearshift elements of the second and fourth spur gear stages can be combined in a double shifting element, thus saving a shift actuator.

Since the fifth gear can now no longer be engaged by means of the third spur gear stage, the third spur gear stage is preferably arranged axially adjacent to the second spur gear stage and the loose wheel of the third spur gear stage is mounted to rotate on the second countershaft. Accordingly the gearshift element of the third spur gear stage and the second coupling shifting element can also be combined in a double shifting element, thus saving a further shift actuator.

The loose wheels of the first spur gear stage and the reversing spur gear stage can as such be arranged anywhere on the second countershaft or the output shaft. To save a further shift actuator, however, it is advantageous for the loose wheels of the first spur gear stage and of the reversing spur gear stage to be arranged both on the output shaft or on the second countershaft, since the gearshift elements of these two spur gear stages can then be combined in a further double shifting element.

BRIEF DESCRIPTION OF THE DRAWINGS

For the further clarification of the invention, the description is attached of drawings of an example embodiment which show.

DETAILED DESCRIPTION OF THE PREFERRED EMBODIMENTS

Figure 1:
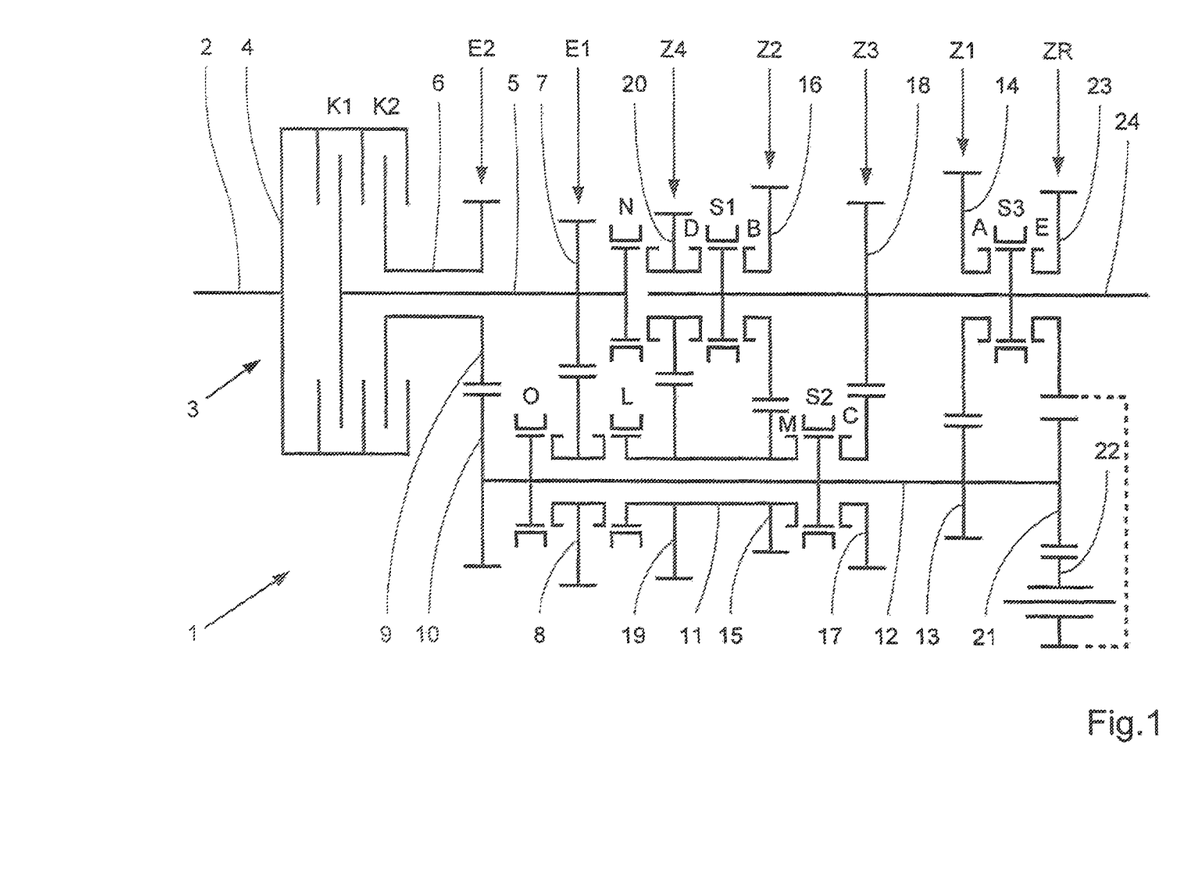
FIG. 1: A dual-clutch transmission designed according to the invention, viewed schematically from the side.

The dual-clutch transmission 1 of which a schematic side view is shown in FIG. 1 has a centrally arranged first input shaft 5 and a second input shaft 6 in the form of a hollow shaft arranged coaxially over the first input shaft 5. On their drive input side the two input shafts 5, 6 can be connected, in each case by a respective friction clutch K1, K2, to the driveshaft 2 of a drive engine (not shown), for example in the form of an internal combustion engine. The two friction clutches K1, K2 are part of a dual-clutch arrangement 3, which has a clutch cage 4 attached in a rotationally fixed manner to the driveshaft 2 of the drive engine. On their transmission side, the two input shafts 5, 6 are or can be brought into driving connection, in each case via a respective input constant E1, E2 which comprises a respective drive input wheel 7, 9 and a respective drive output wheel 8, 9, with one of two countershafts 11, 12. The two countershafts 11, 12 can each be brought selectively into driving connection with an output shaft 24 by way of shiftable spur gear stages Z1, Z2, Z3, Z4, ZR, each of which can be shifted by a number of respective gearshift elements A, B, C, D, E, the output shaft 24 being arranged coaxially with and axially adjacent to the first input shaft 5. The first countershaft 11 is in the form of a hollow shaft and is arranged coaxially and radially over the second countershaft 12.

To engage eight forward gears G1, G2, G3, G4, G5, G6, G7, G8, four spur gear stages Z1, Z2, Z3, Z4 are provided, whose gear ratios $i_{Z1}$, $i_{Z2}$, $i_{Z3}$, $i_{Z4}$ decrease with increasing order number ($i_{Z1} > i_{Z2} > i_{Z3} > i_{Z4}$). To engage two reverse gears R1, R2 a reversing spur gear stage ZR is provided. The four spur gear stages Z1, Z2, Z3, Z4 for forward gears and the reversing spur gear stage ZR have in each case a fixed wheel 13, 15, 18, 19, 21 and a loose wheel 14, 16, 17, 20, 23. To reverse the rotational direction, the reversing spur gear stage ZR additionally has an intermediate wheel 22. The second spur gear stage Z2 and the fourth spur gear stage Z4 are arranged between the first countershaft 11 and the output shaft 24. The other spur gear stages Z1, Z3 and the reversing spur gear stage ZR are arranged between the second countershaft 12 and the output shaft 24.

Compared with the second input constant E2, the first input constant E1 has a higher gear ratio ($i_{E1} > i_{E2}$). The drive input wheel 7 of the first input constant E1 is a fixed wheel attached in a rotationally fixed manner on the first input shaft 5. The drive output wheel 8 of the first input constant E1 is a loose wheel, which is mounted to rotate on the second countershaft 12 and can be connected rotationally fixed to the first countershaft 11 by means of a first coupling shifting element L. The drive input wheel 9 of the second input constant E2 is also a fixed wheel attached rotationally fixed on the second input shaft 6. The drive output wheel 10 of the second input constant E2 is also a fixed wheel, connected in a rotationally fixed manner on the second countershaft 12.

The fourth spur gear stage Z4 is arranged axially adjacent to the first input constant E1. The fixed wheels 15, 19 of the second spur gear stage Z2 and the fourth spur gear stage Z4 are attached rotationally fixed to the first countershaft 11. The loose wheels 16, 20 of these two spur gear stages Z2, Z4 are mounted to rotate on the output shaft 24 and can be connected rotationally fixed thereto by means of the associated gearshift elements B, D. The gearshift elements B, D of the second spur gear stage Z2 and the fourth spur gear stage Z4 are combined in a first double shifting element S1.

On the side of the first countershaft 11 facing axially away from the dual-clutch arrangement 3 is arranged a second coupling shifting element M, by means of which the first countershaft 11 can be connected rotationally fixed to the second countershaft 12.

The third spur gear stage Z3 is arranged axially adjacent to the second spur gear stage Z2. The loose wheel 17 of the third spur gear stage Z3 is mounted to rotate on the second countershaft 12 and can be connected rotationally fixed thereto by means of the associated gearshift element C. The fixed wheel of the third spur gear stage Z3 is attached rotationally fixed on the output shaft 24. The gearshift element C of the third spur gear stage Z3 and the second coupling shifting element M are combined in a second double shifting element S2.

The first spur gear stage Z1 is arranged axially between the third spur gear stage Z3 and the reversing spur gear stage ZR. The fixed wheels 13, 21 of the first spur gear stage Z1 and the reversing spur gear stage ZR are connected rotationally fixed to the second countershaft 12. The loose wheels 14, 23 of these two spur gear stages Z1, ZR are mounted to rotate on the output shaft 24 and can be connected rotationally fixed thereto by means of the associated gearshift elements A, E. The gearshift elements A, E of the first and the reversing spur gear stages Z1, ZR are combined in a third double shifting element S3.

The loose wheel 20 of the fourth spur gear stage Z4 can also be connected in a rotationally fixed manner to the first input shaft 5 by means of a third coupling shifting element N. The drive input shaft 8 of the first input constant E1, in the form of a loose wheel, can also be connected rotationally fixed to the second countershaft 12 by means of a fourth coupling shifting element O.

So that the forward gears G1, G2, G3, G4, G5, G6, G7, G8 that can be engaged by means of the spur gear stages Z1, Z2, Z3, Z4, can be engaged in ascending sequence alternately by means of the friction clutches K1, K2, the spur gear stages Z1, Z2, Z3, Z4 of the forward gears have a substantially geometric gear ratio gradation ($i_{Zn}/i_{Zn+1}$=constant). Furthermore, the gear ratio gradation $i_{E1}/i_{E2}$ of the input constants E1, E2 is substantially equal to the square-root of the gear ratio gradation ($i_{Zn}/i_{Zn+1}$) of the spur gear stages Z1 to Z4 of the forward gears ($i_{E1}/i_{E2}=(i_{Zn}/i_{Zn+1})^{1/2}$).

Figure 2A:
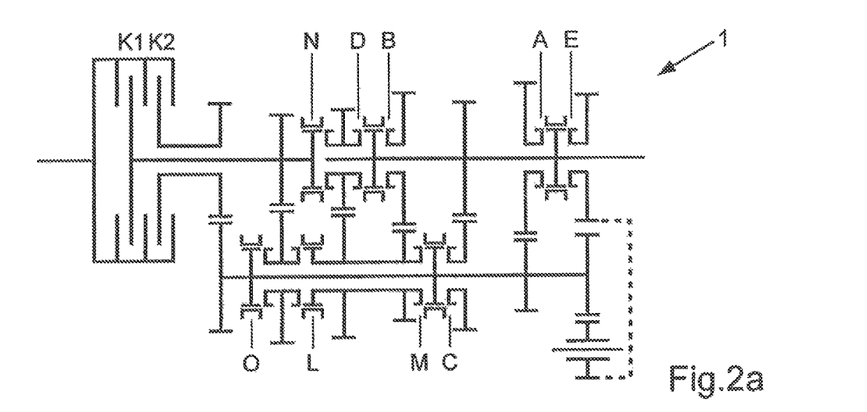
FIG. 2a: The dual-clutch transmission of FIG. 1, shown schematically on a smaller scale.
Figure 2B:
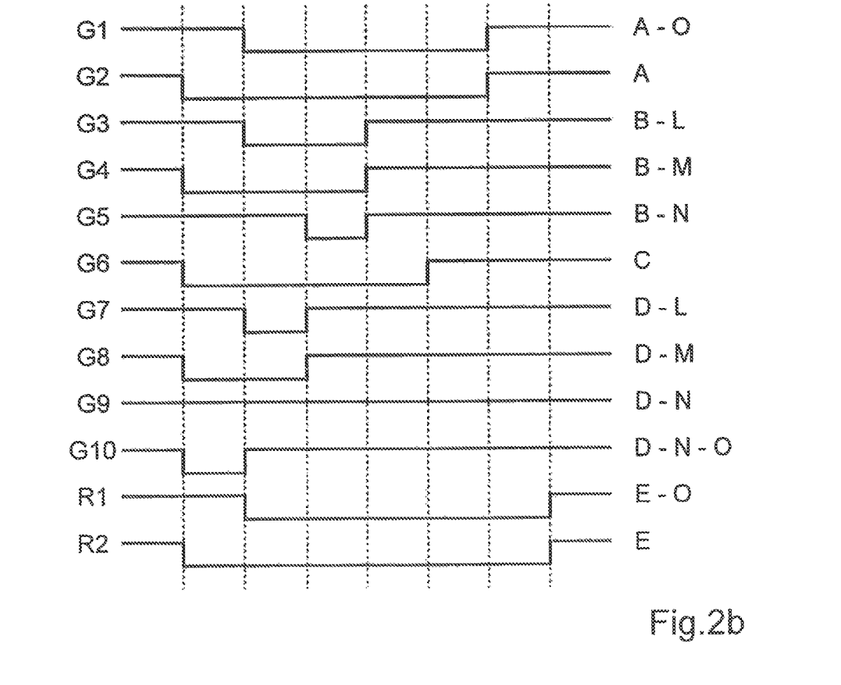
FIG. 2b: A force flow diagram for the dual-clutch transmission according to FIG. 2a, and FIG. 3: A shifting scheme for the dual-clutch transmission according to FIGS. 1 and 2a, with example gear ratios, shown in the form of a table.

As is clear from FIGS. 2a and 2b, when the first gear G1 is engaged, the friction clutch K1 is closed and the fourth coupling element O and the gearshift element A of the first spur gear stage Z1 are engaged, the force flow passes from the driveshaft 2 of the drive engine, via the first input shaft 5, the first input constant E1, the second countershaft 12 and the first spur gear stage Z1, to the output shaft 24. Alternatively, the first gear G1 can also be engaged by engaging the first and second coupling shifting elements L, M and the gearshift element A of the first spur gear stage Z1. However, the latter method has the disadvantage that a total of three shifting elements A, L, M would have to be engaged.

When the second gear G2 is engaged, the second friction clutch K2 is closed and the gearshift element A of the first spur gear stage Z1 is engaged, the force flow passes from the driveshaft 2 of the drive engine, via the second input shaft 6, the second input constant E2, the second countershaft 12 and the first spur gear stage Z1, to the output shaft 24.

In the third gear G3, which is engaged by engaging the first coupling shifting element L and the gearshift element B of the second spur gear stage Z2, when the first friction clutch K1 is closed the force flow passes from the driveshaft 2 of the drive engine, via the first input shaft 5, the first input constant E1, the first countershaft 11 and the second spur gear stage Z2, to the output shaft 24.

In the fourth gear G4, which is engaged by engaging the second coupling shifting element M and the gearshift element B of the second spur gear stage Z2, when the second friction clutch K2 is closed the force flow passes from the driveshaft 2 of the drive engine, via the second input shaft 6, the second input constant E2, the second countershaft 12, the first countershaft 11 and the second spur gear stage Z2, to the output shaft 24.

In principle the fifth gear G5 could be engaged by engaging the first and second coupling shifting elements L, M and the gearshift element C of the third spur gear stage Z3. But then, since owing to the respective coupling of the two countershafts 11, 12 the two gearshift elements B, C of the second and third spur gear stages Z2, Z3 cannot be engaged simultaneously, shifts between the fourth gear G4 and the fifth gear G5 would not be powershifts. Accordingly it is provided that the fifth gear G5 is engaged by engaging the third coupling shifting element N and the gearshift element B of the second spur gear stage Z2. In the fifth gear G5, when the first friction clutch K1 is closed, the force flow therefore passes from the driveshaft 2 of the drive engine, via the first input shaft 5, the fourth spur gear stage Z4, the first countershaft 11 and the second spur gear stage Z2, to the output shaft 24. Thereby, shifts between the fourth and fifth gears G4, G5 are also powershiftable.

When the sixth gear G6 is engaged, the second friction clutch K2 is closed and the gearshift element C of the third spur gear stage Z3 is engaged, the force flow passes from the driveshaft 2 of the drive engine, via the second input shaft 6, the second input constant E2, the second countershaft 12 and the third spur gear stage Z3, to the output shaft 24.

In the seventh gear G7, which is engaged by engaging the first coupling shifting element L and the gearshift element D of the fourth spur gear stage Z4, when the first friction clutch K1 is closed the force flow passes from the driveshaft 2 of the drive engine, via the first input shaft 5, the first input constant E1, the first countershaft 11 and the fourth spur gear stage Z4, to the output shaft 24.

In the eighth gear G8, which is engaged by engaging the second coupling shifting element M and the gearshift element D of the fourth spur gear stage Z4, when the second friction clutch K2 is closed the force flow passes from the driveshaft 2 of the drive engine, via the second input shaft 6, the second input constant E2, the second countershaft 12, the first countershaft 11 and the fourth spur gear stage Z4, to the output shaft 24. Alternatively, however, the eighth gear G8 could be engaged by engaging the first coupling shifting element L and the fourth coupling shifting element O as well as the gearshift element D of the fourth spur gear stage Z4, but this would have the disadvantage that three shifting elements D, L and O had to be engaged.

By engaging the third coupling shifting element N and the gearshift element D of the fourth spur gear stage Z4, a direct gear (ninth gear G9) can also be obtained, in which, when the first friction clutch K1 is closed, the force flow passes from the driveshaft 2 of the drive engine, via the first input shaft 5 and the loose wheel 20 of the fourth spur gear stage Z4, to the output shaft 24. The gear ratios $i_{E1}$, $i_{E2}$, $i_{Z1}$-$i_{Z4}$ of the two input constants E1, E2 and of the spur gear stages Z1, Z2, Z3, Z4 of the forward gears are chosen such that the direct gear G9 has a lower gear ratio than the eighth gear G8 ($i_{G8}>i_{G9}$). In addition it is provided that the gear interval between the direct gear G9 and the adjacent eighth gear G8 corresponds substantially to the gear gradation of the other gears G1, G2, G3, G4, G5, G6, G7, G8 ($i_{G8}/i_{G9}=i_{Gn}/i_{Gn+1}$). Thus, the direct gear forms the ninth forward gear G9 of the dual-clutch transmission 1.

A further forward gear can be obtained by means of the two input constants E1, E2 if the third coupling shifting element N and the fourth coupling shifting element O as well as the gearshift element D of the fourth spur gear stage Z4 are engaged. In this tenth gear G10, when the second friction clutch K2 is closed the force flow passes from the driveshaft 2 of the drive engine, via the second input shaft 6, the second input constant E2, the first input constant E1 and the loose wheel 20 of the fourth spur gear stage Z4, to the output shaft 24. So that this additional gear forms the tenth forward gear G10 of the dual-clutch transmission 1, the gear ratios $i_{E1}$, $i_{E2}$, $i_{Z1}$-$i_{Z4}$ of the two input constants E1, E2 and those of the spur gear stages Z1, Z2, Z3, Z4 of the forward gears are chosen such that the gear G10 has a lower gear ratio than the direct gear G9 ($i_{G9}>i_{G10}$), and the gear interval between this tenth gear G10 and the adjacent direct gear (ninth gear G9) corresponds substantially to the gear gradation between the other gears G1-G9 ($i_{G9}/i_{G10}=i_{Gn}/i_{Gn+1}$).

When the first reverse gear R1 is engaged, then with the first friction clutch K1 closed and the fourth coupling shifting element O as well as the gearshift element E of the reversing spur gear stage ZR engaged, the force flow passes from the driveshaft 2 of the drive engine, via the first input shaft 5, the first input constant E1, the second countershaft 12 and the reversing spur gear stage ZR, to the output shaft 24. Alternatively, the first reverse gear R1 can also be engaged by engaging the first coupling shifting element L, the second coupling shifting element M and the gearshift element E of the reversing spur gear stage ZR. However, this has the disadvantage that all three of the shifting elements E, L, M have to be engaged.

When the second reverse gear R2 is engaged, then with the second friction clutch K2 closed and the reverse gearshifting element E of the reversing spur gear stage ZR engaged, the force flow passes from the driveshaft 2 of the drive engine, via the second input shaft 6, the second input constant E2, the second countershaft 12 and the reversing spur gear stage ZR, to the output shaft 24.

Thus, with a total of only seven gearwheel planes the dual-clutch transmission 12 has ten powershiftable forward gears G1-G10 and two powershiftable reverse gears R1, R2. The gear gradation of the forward gears G1-G10 is substantially geometric, that is to say, within the scope of the accuracy possible in gearing technology, which is typical for a utility vehicle transmission.

The force flows described above in the gears G1-G10, R1, R2 concerned are shown clearly in the force flow diagram of FIG. 2b. At the right-hand end of the force flow lines shown therein the gearshift elements and coupling shifting elements A, B, C, D, E, L, M, N, O respectively engaged in each case in the gears G1-G10, R1, R2 are indicated. With the force flow diagram of FIG. 2b is associated by virtue of FIG. 2a the dual-clutch transmission 1 according to FIG. 1 shown on a smaller scale, directly and correctly as regards the arrangement of the spur gear stages. In the dual-clutch transmission 1 shown on a smaller scale, for the sake of simplicity only the two friction clutches K1, K2 and the shifting elements A, B, C, D, E, L, M, N, O are indexed.

Figure 3:
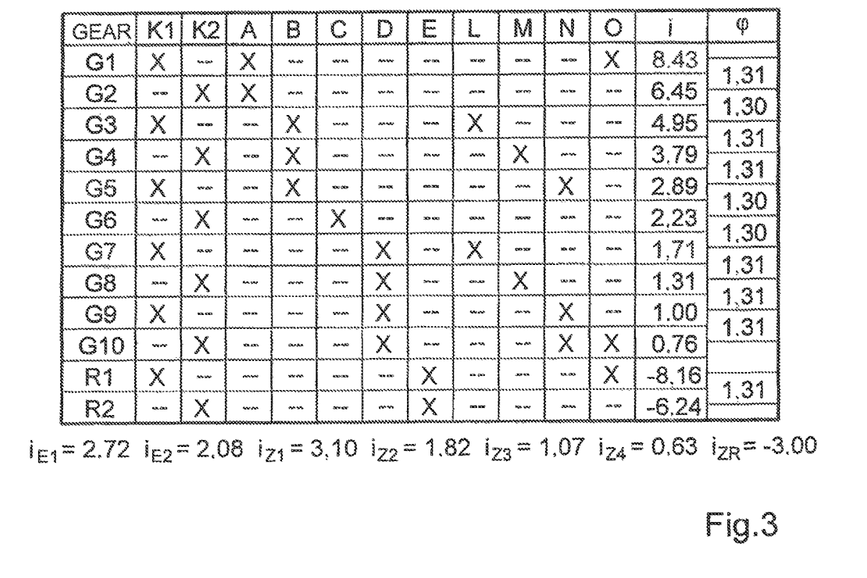

The shifting scheme of the dual-clutch transmission 1 according to FIGS. 1 and 2a, with indications of example gear ratios i of the gears G1-G10, R1, R2 and the gear intervals φ resulting therefrom, is summarized in the table shown as FIG. 3. In the table, the closed condition of the friction clutches K1, K2 and the engaged condition of the gearshift elements A-E and the coupling shifting elements L-O are in each case indicated with a cross. The gear ratios $i_{E1}$, $i_{E2}$, $i_{Z1}$-$i_{Z4}$, $i_{ZR}$ of the input constants E1, E2, the spur gear stages Z1-Z4 and the reversing spur gear stage ZR are shown in the line under the table of FIG. 3.

INDEXES

1 Dual-clutch transmission
2 Driveshaft
3 Dual-clutch arrangement
4 Clutch cage
5 First input shaft
6 Second input shaft
7 Drive input wheel of the input constant E1
8 Drive output wheel of the input constant E1
9 Drive input wheel of the input constant E2
10 Drive output wheel of the input constant E2
11 First countershaft
12 Second countershaft
13 Fixed wheel of spur gear stage Z1
14 Loose wheel of spur gear stage Z1
15 Fixed wheel of spur gear stage Z2
16 Loose wheel of spur gear stage Z2
17 loose wheel of spur gear stage Z3
18 Fixed wheel of spur gear stage Z3
19 Fixed wheel of spur gear stage Z4
20 Loose wheel of spur gear stage Z4
21 Fixed wheel of spur gear stage ZR
22 Intermediate wheel of spur gear stage ZR
23 Loose wheel of spur gear stage ZR
24 Output shaft
A Gearshift element of spur gear stage Z1
B Gearshift element of spur gear stage Z2
C Gearshift element of spur gear stage Z3
D Gearshift element of spur gear stage Z4
E Gearshift element of spur gear stage ZR
E1 First input constant
E2 Second input constant
G1-G10 Forward gears, Gears
i Gear ratio
$i_{E1}$ Gear ratio of the input constant E1
$i_{E2}$ Gear ratio of the input constant E2
$i_{G1}$-$i_{G10}$ Gear ratios of the gears G1 to G10
$i_{Gn}$ Gear ratio of the n-th gear
$i_{Gn+1}$ Gear ratio of the (n+1)-th gear
$i_{R1}$ Gear ratio of the reverse gear R1
$i_{R2}$ Gear ratio of the reverse gear R2
$i_{Z1}$ Gear ratio of the spur gear stage Z1
$i_{Z2}$ Gear ratio of the spur gear stage Z2
$i_{Z3}$ Gear ratio of the spur gear stage Z3
$i_{Z4}$ Gear ratio of the spur gear stage Z4
$i_{ZR}$ Gear ratio of the spur gear stage ZR
$i_{Zn}$ Gear ratio of the n-th spur gear stage
$i_{Zn+1}$ Gear ratio of the (n+1)-th spur gear stage
K1 First friction clutch
K2 Second friction clutch
L First coupling shifting element
M Second coupling shifting element
N Third coupling shifting element
O Fourth coupling shifting element
R1 First reverse gear
R2 Second reverse gear
S1 First double shifting element
S2 Second double shifting element
S3 Third double shifting element
Z1 First spur gear stage
Z2 Second spur gear stage
Z3 Third spur gear stage
Z4 Fourth spur gear stage
ZR Reversing spur gear stage
φ Gear interval

The invention claimed is:

1. A dual-clutch transmission of a motor vehicle comprising:
a centrally arranged first input shaft and a second input shaft in the form of a hollow shaft being arranged coaxially over the first input shaft;
drive input sides of the first and the second input shafts each being connectable, by a respective friction clutch, to a driveshaft of a drive engine;
transmission sides of the first and the second input shafts being drivingly connectable, by way of a respective input constant, with a respective countershaft, and the input constants comprising a drive input wheel and a drive output wheel;
the first and the second countershafts being selectively drivingly connectable, via a plurality of spur gear stages each of which are engagable by a respective gearshift element, with an output shaft that is arranged coaxially with and axially adjacent to the first input shaft;
the first countershaft being a hollow shaft that is arranged coaxially over the second countershaft;
first, second, third and fourth spur gear stages engaging forward gears, gear ratios of the first, the second, the third and the fourth spur gear stages decrease with increasing order number, and one reversing spur gear stage engages reverse gears;

the second spur gear stage and the fourth spur gear stage being arranged between the first countershaft and the output shaft;

the first and the third spur gear stages and the reversing spur gear stage being arranged between the second countershaft and the output shaft;

the first input constant having a higher gear ratio than the second input constant;

the drive output wheel of the first input constant being a loose wheel, which is mounted to rotate on the second countershaft and being connectable, in a rotationally fixed manner, to the first countershaft by a first coupling shifting element; and the first countershaft being connectable, in rotationally fixed manner, to the second countershaft by a second coupling shifting element.

2. The dual-clutch transmission according to claim 1, wherein the first, the second, the third and the fourth, spur gear stages for the forward gears have a substantially geometric gear gradation; and a gear ratio gradation of the input constants corresponds substantially to a square-root of the gear ratio gradation of the first, the second, the third and the fourth spur gear stages for the forward gears.

3. The dual-clutch transmission according to claim 1, wherein the fourth spur gear stage is arranged axially adjacent to the first input constant; and a loose wheel, of the fourth spur gear stage, is mounted to rotate on the output shaft and is connectable thereto in a rotationally fixed manner by a third coupling shifting element.

4. The dual-clutch transmission according to claim 3, wherein the gear ratios of the input constants and of the first, the second, the third and the fourth spur gear stages for the forward gears are chosen such that, a fifth gear, which is engagable by the third coupling shifting element and the gearshift element of the second spur gear stage, has a lower gear ratio than a fourth gear which is engagable by the second coupling shifting element and the gearshift element of the second spur gear stage, and a higher gear ratio than a sixth gear which is engagable by the gearshift element of the third spur gear stage; and gear intervals between the fifth gear and the fourth and the sixth gears adjacent thereto correspond substantially to gear intervals of the other gears.

5. The dual-clutch transmission according to claim 3, wherein the gear ratios of the input constants and of the first, the second, the third and the fourth spur gear stages are selected such that:

a direct gear, which is engagable by the third coupling shifting element and the gearshift element of the fourth spur gear stage, has a lower gear ratio than an eighth gear which is engagable by the second coupling shifting element and the gearshift element of the fourth spur gear stage; and a gear interval between the direct gear and the eighth gear corresponds substantially to the gear gradation of the other gears.

6. The dual-clutch transmission according to claim 3, wherein the loose wheel of the first input constant is connectable, in rotationally fixed manner, to the second countershaft by a fourth coupling shifting element.

7. The dual-clutch transmission according to claim 6, wherein the gear ratios of the first and the second input constants and of the first, the second, the third and the fourth spur gear stages are selected such that:

a tenth gear, which is engagable by the third and the forth coupling shifting elements and the gearshift element of the fourth spur gear stage, has a lower gear ratio then a direct gear, which is engagable by the third coupling shifting element and the gearshift element of the forth spur gear stage; and a gear interval between the tenth gear and the direct gear corresponds substantially to the gear gradation of the other gears.

8. The dual-clutch transmission according to claim 1, wherein a loose wheel of the second spur gear stage is mounted to rotate on the output shaft, and the gearshift elements of the second and the fourth spur gear stages are combined in a double shifting element.

9. The dual-clutch transmission according to claim 1, wherein the third spur gear stage is arranged axially adjacent to the second spur gear stage, a loose wheel of the third spur gear stage is mounted to rotate on the second countershaft, and the gearshift element of the third spur gear stage and the second coupling shifting element are combined in a double shifting element.

10. The dual-clutch transmission according to claim 1, wherein the loose wheels of the first spur gear stage and the reversing spur gear stage are arranged together either on the output shaft or on the second countershaft, and the gearshift elements of the first spur gear stage and the reversing spur gear stage are combined in a double shifting element.

11. A dual-clutch transmission of a motor vehicle, first and second input shafts, the second input shaft being a hollow shaft and the first input shaft being coaxial with and extending through the second input shaft;

an input side of the first input shaft being connectable, via a first friction clutch, to driveshaft of a drive engine, and an input side of the second input shaft being connectable, via a second friction clutch, to the driveshaft of the drive engine;

a transmission side of the first input shaft being connectable with a first countershaft via a first input constant which comprises a drive input wheel and a drive output wheel, the first countershaft being selectively drivingly connectable with an output shaft by a plurality of spur gear stages which are engagable by respective gear shifting elements, and the output shaft being coaxially aligned with and axially spaced from the first input shaft;

the second countershaft being selectively drivingly connectable with the output shaft by the plurality of spur gear stages which are engagable by the respective gear shifting elements, and the first countershaft being a hollow shaft and the second countershaft being coaxial with and extending through the first countershaft;

the plurality of spur gear stages comprising first, second, third and fourth spur gear stages which engage forward gears and a reverse spur gear stage which engages reverse gears, the first spur gear stage having a transmission ratio, the second spur gear stage has a transmission ratio that is lower than the transmission ratio of the first spur gear stage, the third spur gear stage having a transmission ratio that is lower than the transmission ratio of the second spur gear stage, and the fourth spur gear stage having a transmission ratio that is lower than the transmission ratio of the third spur gear stage;

the second spur gear stage and the fourth spur gear stage selectively coupling the first countershaft to the output shaft;

the first and the third spur gear stages and the reversing spur gear stage selectively coupling the second countershaft to the output shaft;

the first input constant having a higher gear ratio than the second input constant;

the drive output wheel of the first input constant being a loose wheel, which is rotatably mounted on the second countershaft and being connectable, in a rotationally fixed manner, to the first countershaft by a first coupling shifting element; and the first countershaft being rotationally connectable to the second countershaft by a second coupling shifting element.

* * * * *